Figure 1:
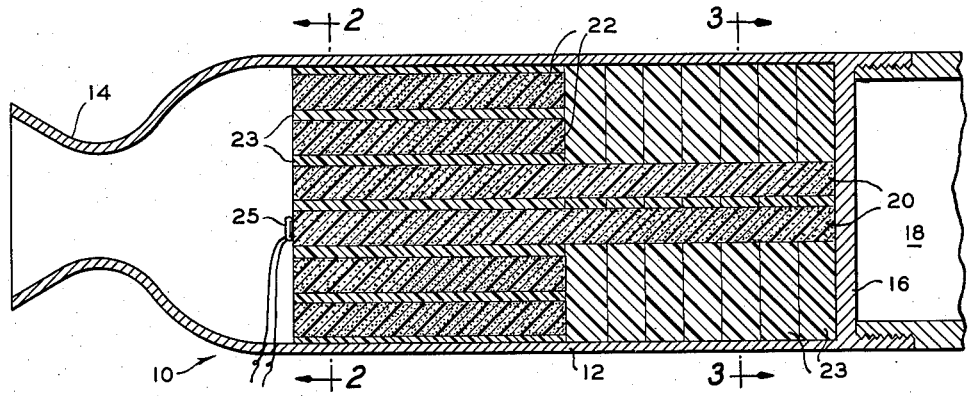

March 6, 1962 W. W. CROUCH 3,023,570
ROCKET MOTOR WITH CONTROLLED PROPELLANT CHARGE
Filed June 13, 1955 2 Sheets-Sheet 1

INVENTOR.
W. W. CROUCH
BY *Hudson and Young*
ATTORNEYS

March 6, 1962    W. W. CROUCH    3,023,570
ROCKET MOTOR WITH CONTROLLED PROPELLANT CHARGE
Filed June 13, 1955    2 Sheets-Sheet 2

INVENTOR.
W. W. CROUCH
BY *Hudson & Young*
ATTORNEYS

United States Patent Office 3,023,570
Patented Mar. 6, 1962

3,023,570
ROCKET MOTOR WITH CONTROLLED
PROPELLANT CHARGE
Willie W. Crouch, Bartlesville, Okla., assignor to Phillips Petroleum Company, a corporation of Delaware
Filed June 13, 1955, Ser. No. 514,803
8 Claims. (Cl. 60—35.6)

This invention relates to a rocket motor having a propellant charge which provides a variable thrust as the propellant is burned. A specific aspect of the invention pertains to a method of controlling the thrust of a rocket motor propellant charge.

The invention provides a rocket or rocket motor which is charged with a propellant having a variable thrust. In one type of rocket it is advantageous to have two stages of thrust, the first being of high thrust to boost the missile or load to its flight velocity and the second of lower thrust to sustain the missile in flight. It is feasible to design the rocket charge so that the two stages are of equal or unequal duration, as may be desired, and this is accompilshed by designing the charge so as to control the amount of propellant burned in each stage. Variation in thrust of a solid-propellant motor may be accomplished by changing the propellant burning rate, the burning area of the grain, or the nozzle throat area. This invention provides a simple and efficient method and means of changing the burning area of the grain.

The principal object of the invention is to provide a rocket motor of controlled thrust characteristics. Another object is to provide a rocket motor having a propellant charge of varying thrust characteristics suited to the particular needs of any given rocket motor application. Another object of the invention is to provide a rocket motor having a propellant charge of decreasing thrust characteristics as the charge is burned. A further object is to provide a rocket motor having a propellant charge designed to produce multiple stages of varying thrust. It is also an object of the invention to provide a method of controlling the thrust of a rocket motor. Other objects of the invention will become apparent from a consideration of the accompanying disclosure.

There are four principal motor systems for producing the two-stage thrust program. These systems are: (1) single propellant-burning area (and thrust) established by the geometry of the grain, (2) bipropellant-thrust variation obtained by using two propellants of different burning rates, (3) separate motors—one giving the boost thrust and the other the sustain thrust, (4) variable area nozzle—used alone or in conjunction with a single or bipropellant system.

Employment of the two motor systems designated as (3) and (4) involves considerable mechanical complexity which is undesirable. Of the motor systems designated as (1) and (2) the single propellant system is the simplest and is the one with which this invention is concerned. The invention provides for varying the geometrical construction of the propellant grains of the charge placed in the rocket so as to obtain a thrust characteristic curve of any desired shape. The propellant charge is formed or assembled from individually burning grains of different lengths positioned so that the number of grains burning at various stages of burning of the charge changes so as to provide the thrust desired in any particular stage. The individually burning grains can be so arranged as to effect high initial thrust and low terminal thrust or vice versa. It is also feasible to arrange the grains in the charge so that three or more stages of thrust are provided. If desired, the charge may be designed so that an intermediate thrust stage reaches a maximum. Thus, the invention provides great flexibility in the thrust characteristic curve of a rocket propellant charge.

Figures 2, 3, 4:
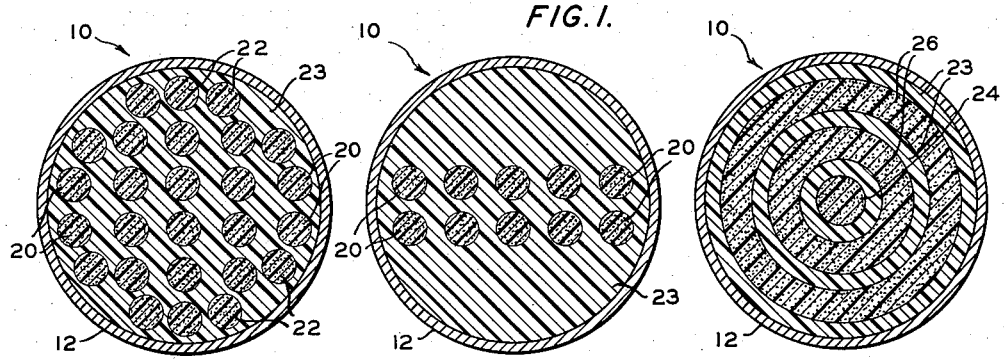
Figure 5:
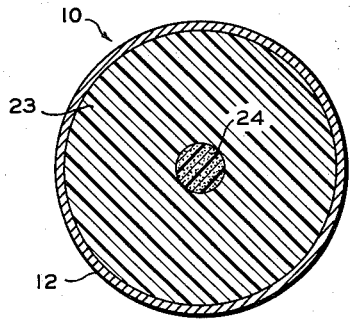
Figure 7:
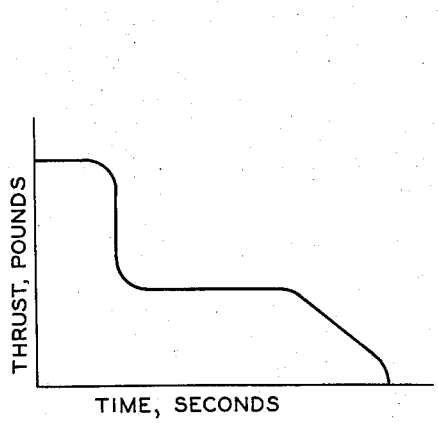
Figure 6:
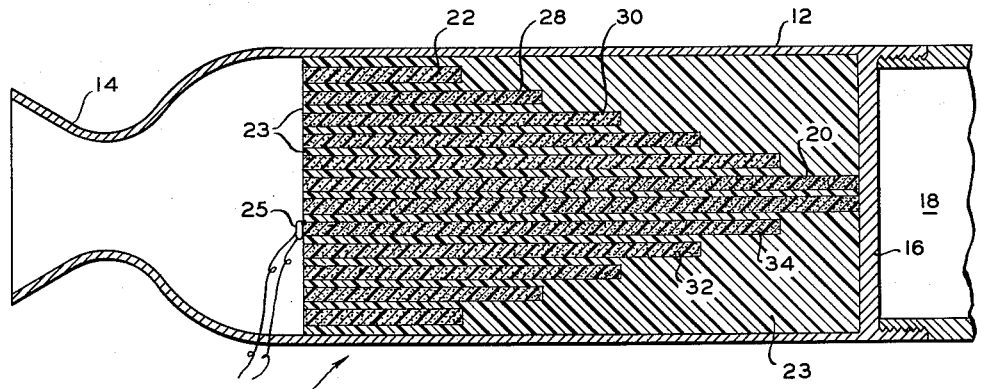
Figure 8:
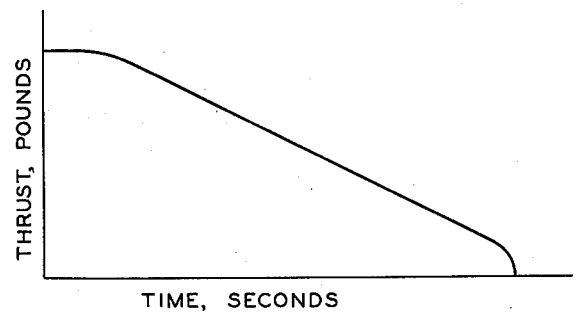
Figure 9:
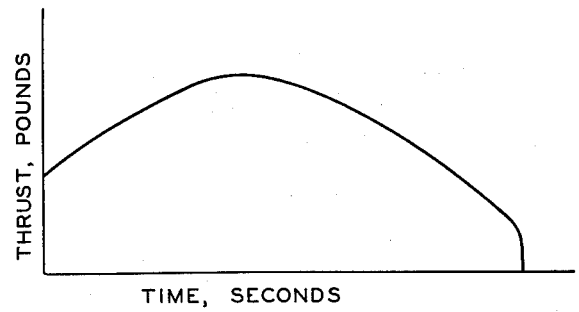

More complete understanding of the invention may be had by reference to the accompanying schematic drawing of which FIGURE 1 is a longitudinal axial cross section of a rocket motor showing an arrangement of the propellant charge in accordance with one embodiment of the invention; FIGURE 2 is a transverse cross section taken on the line 2—2 of FIGURE 1; FIGURE 3 is a transverse cross section taken on the line 3—3 of FIGURE 1; FIGURES 4 and 5 are transverse cross sections similar to FIGURES 2 and 3 of a rocket provided with a charge arranged in accordance with a second embodiment of the invention; FIGURE 6 is a longitudinal axial cross section of a rocket motor containing a propellant charge arranged in accordance with a third embodiment of the invention; and FIGURES 7, 8, and 9 are curves illustrating the thrust characteristics of rocket propellant charges of different arrangement in accordance with the invention. Corresponding elements of the various figures are correspondingly numbered.

Referring to FIGURES 1–5, numeral 10 designates a rocket motor having a tubular shell or casing 12 to which is attached at one end a venturi exhaust nozzle 14 and closed at the opposite end by closure member 16. Attached to the forward end of the motor is any suitable load 18. The propellant charge comprises individually burning grains 20 and 22, grains 20 being positioned in parallel rows adjacent a diameter of the rocket as shown more clearly in FIGURE 2, while grains 22 are positioned between grains 20 and shell 12. A suitable restricting material designated as 23 encases each of the grains and renders them individually burning. An electrical squib 25 positioned adjacent the downstream end of the charge is utilized to ignite the propellant charge. The propellant grains 20 and 22 are of such lengths as to yield the desired stages of thrust. In most applications of the invention the maximum ratio of the length of the longest grains to the shortest is about 10 to 1 and, where only two stages of thrust are involved, the longer grains are at least 10% longer than the shorter grains. The grains can be of any desired shape, such as cylindrical, rectangular, annular, etc. FIGURES 2 and 3 illustrate grains of cylindrical configuration in the form of rods, while FIGURES 4 and 5 illustrate an embodiment of the invention utilizing a cylindrical axial grain 24 surrounded by several concentric annular grains 26. The grains as arranged in FIGURES 2 and 3 and in 4 and 5 fit the cross section shown in FIGURE 1; however, it is feasible to adjust the lengths of the grains so as to provide more than two stages of thrust. For example, inner annulus 26 may be made of intermediate length relative to axial grain 24 and outer annulus 26. In the same manner, the lengths of the grains in FIGURE 2 may be adjusted so as to provide grains of three or more lengths thereby providing as many thrust stages.

FIGURE 6 illustrates an embodiment of the invention in which the charge comprises grains of several different lengths such as 20, 22, 28, 30, 32, and 34 positioned so as to extend forward in the rocket from a vertical plane located near the outlet end of the rocket. This arrangement provides a thrust pattern of high initial power and very gradually decreasing as substantially illustrated in FIGURE 8. The grains shown in FIGURE 6 may be annular with the exception of grains 20 which may be in the form of a single axial cylindrical grain or the grains may be rod-like as illustrated in FIGURES 2 and 3. The longest grains in this embodiment are preferably at least twice as long as the shortest grains.

FIGURE 7 is generally illustrative of thrust pattern of the embodiment of the invention shown in FIGURES 1–5 and is self-explanatory. FIGURE 8, as indicated above, is illustrative of the thrust pattern provided by the propellant charge shown in FIGURE 6. FIGURE 9 illustrates the thrust pattern yielded by a propellant charge in which the concentration of the individually burning grains is greatest intermediate the ends of the charge thereby providing maximum thrust at an intermediate stage of the burning phase.

The propellant charge is secured within the combustion chambed by any suitable means known in the art and the separation of the grains to render them individually burning is made by application of a suitable restrictive material known in the art which will permit burning only on the unrestricted faces at the downstream end of the charge. Ignition of the grains may be accomplished by an electrical squib as discussed above or by any other suitable means.

The invention is applicable to propellants, generally, in individually-burning grain form. However, one type of solid propellant which is particularly effective when prepared in restricted, individually-burning grains comprises a rubbery copolymer of a conjugated diene with a polymerizable heterocyclic nitrogen base of the pyridine series, such as vinylpyridine and various alkyl-substituted derivatives thereof. The propellant composition is prepared by mixing the copolymer with a solid oxidant, a burning rate catalyst, and various compounding ingredients, and heating the mixture to effect curing thereof. Restrictive material may comprise the polymer without the oxidant or conventional restrictive materials such as tapes, plastics, etc.

It is apparent that other modifications of the geometry of the grain can be made with a resulting change in the thrust program curve and without departing from the inventive concept as herein described. By assembling the rocket motor with a multiplicity of restricted grains of varying length, a rocket motor may be provided which will perform according to a predetermined thrust program curve and which, because of the number of grains, gives a more reproducible overall performance.

Certain modifications of the invention will become apparent to those skilled in the art and the illustrative details disclosed herein are not to be construed as imposing unnecessary limitations on the invention.

I claim:

1. A rocket motor comprising an elongated firing chamber closed at the forward end and opening rearwardly through a nozzle, and a propellant charge in said chamber comprising a plurality of individually burning grains separated by restricting material, said charge being free of open internal combustion space to limit burning solely from the nozzle end to the forward end, said grains extending longitudinally of said chamber, at least one of which extends farther forward than the others so as to provide at least two stages of thrust when said charge is burned.

2. The motor of claim 1 wherein said grains extend forwardly from a common transverse rearward plane in said chamber so that said thrust is maximum in the first burning stage.

3. The motor of claim 2 wherein at least one longer grain is positioned axially of said chamber and shorter grains are positioned between said longer grain and the wall of said chamber.

4. The motor of claim 2 including at least one longer grain positioned adjacent the axis of said chamber and at least one shorter grain in the form of an annulus surrounding said longer grain.

5. The motor of claim 2 including a longer cylindrical grain positioned axially of said chamber and surrounded by a plurality of annular shorter grains coaxial with said longer grain.

6. A rocket motor comprising an elongated firing chamber closed at the forward end and opening rearwardly through a nozzle, and a propellant charge in said chamber comprising a plurality of individually burning grains extending longitudinally of said chamber, said grains comprising a core surrounded by cylindrical grains of lesser length than said core, all of said grains being separated by restricting material and said charge being free of open internal combustion space to provide solely forward burning resulting in a plurality of thrust stages when said charge is burned.

7. A propellant charge comprising a plurality of elongated, individually-burning grains arranged parallel and extending from a common transverse plane, said grains including a longer axial grain and at least one shorter coaxial annular grain, all of said grains being separated by restricting material and said charge being free of open internal combustion space to limit the charge solely to end to end burning to provide a plurality of thrust stages when burned in a rocket motor.

8. A propellant charge comprising a plurality of elongated, individually-burning grains arranged parallel, said grains comprising a longer core surrounded by a plurality of shorter hollow cylindrical grains coaxial with said core, said grains being separated by restricting material and said charge being free of open internal combustion space to limit the charge solely to longitudinal burning to provide a plurality of thrust stages when burned in a rocket motor.

References Cited in the file of this patent

UNITED STATES PATENTS

| | | |
|---|---|---|
| 956,813 | Maxim | May 3, 1910 |
| 2,488,154 | Africano | Nov. 15, 1949 |
| 2,502,458 | Hickman | Apr. 4, 1950 |
| 2,703,960 | Prentiss | Mar. 15, 1955 |
| 2,755,620 | Gillot | July 24, 1956 |

FOREIGN PATENTS

| | | |
|---|---|---|
| 543,739 | Great Britain | Mar. 11, 1942 |
| 659,758 | Great Britain | Oct. 24, 1951 |